UNITED STATES PATENT OFFICE.

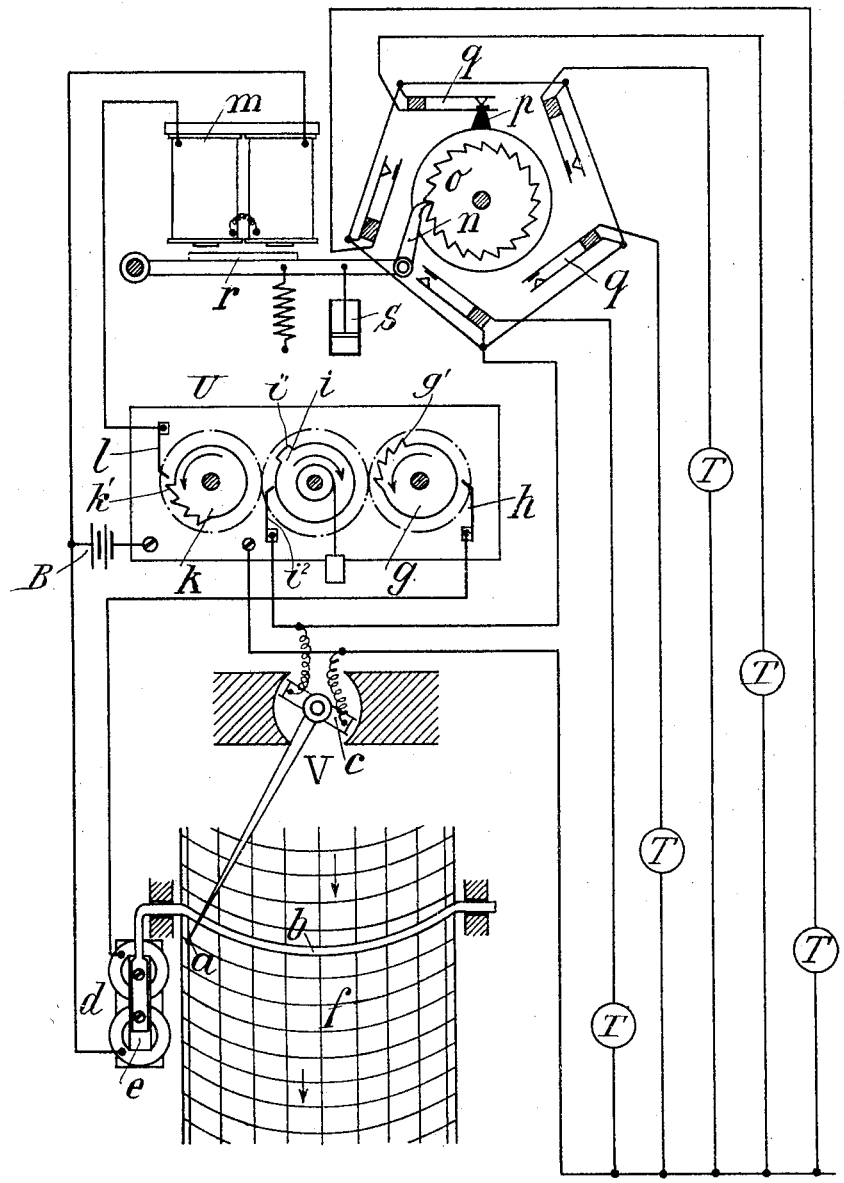

PAUL RASEHORN, OF FRIEDENAU, BERLIN, GERMANY, ASSIGNOR TO SIEMENS & HALSKE AKTIENGESELLSCHAFT, OF BERLIN, GERMANY.

AUTOMATIC ELECTRICAL MEASURING AND RECORDING INSTRUMENT.

No. 807,774.     Specification of Letters Patent.     Patented Dec. 19, 1905.

Application filed November 22, 1904. Serial No. 233,909.

*To all whom it may concern:*

Be it known that I, PAUL RASEHORN, a subject of the King of Prussia, German Emperor, residing at Friedenau, Berlin, Germany, have invented certain new and useful Improvements in Automatic Electrical Measuring and Recording Instruments, of which the following is a specification.

My invention relates to an apparatus for continuously and automatically measuring and recording electrical quantities, thus showing the course or progress of electrical or other physical occurrences which influence the electrical quantities to be measured.

The recording of the value of the electrical quantities is effected according to this invention by the aid of a single electrical measuring instrument which is changeably connected with the electrical conductors or circuits in which the measurements are to be made and the putting in of which is recorded in certain regular time intervals on a paper ribbon or the like by means of a suitable apparatus. The apparatus is so constructed as to give a series of records for each of the separate processes in the nature of a series of dots or points upon the ribbon, which are so close to one another as to constitute practically a continuous line or curve.

The invention can also be used for measuring and continuously recording the value of other physical quantities—for example, temperatures—by the measurement of electrical quantities. Thus in the following is described a form of apparatus embodying the invention, which serves to record the course of temperature in five different places.

In the accompanying drawing is illustrated diagrammatically a form of apparatus embodying the invention as above described for recording the course or progress of temperature in five different places. This is accomplished by the insertion of a thermo element T in the place where the temperature is to be measured, which thermo element is connected up with a sensitive measuring device V. The temperature which is recorded is determined by the electromotive force which is produced in the thermopile and can be directly read off on the registering instrument.

The recording instrument is of well-known form and construction and is indicated at V. Attached to this instrument is an index-finger $a$, provided at its extremity with an ink-point normally out of contact with a paper ribbon $f$, which is moved by means of a clockwork which comprises a train of gears $k$, $i$, and $g$, connected in circuit with a battery B. The clockwork may be given any desired speed—such as, for instance, to cause the train of gears to make one complete revolution per minute. Gear $g$ is provided with four teeth $g'$, arranged to make contact with a contact-piece $h$. It will be seen that four successive contacts, closely following one another, will be made by the teeth $g'$ with the contact $h$. The contact $h$ is connected in circuit with an electromagnet $d$ and the battery B. Magnet $d$ is provided with an armature $e$, to which is secured a lever $b$ and which bears against the index-finger of the recording instrument V. Upon energizing of magnet $d$ by the means described the ink-point $a$ of the index-finger will be depressed upon the paper $f$ to make a record. The four short contacts made by the teeth $g'$ will cause four records in the nature of four short dashes, which practically constitute a continuous line. The lever $b$ is suitably weighted to raise the ink-point $a$ from the paper $f$ when the magnet $d$ is deënergized by the breaking of its circuit. It will thus be seen that this record is made once per minute or any other length of time which may be determined upon, according to the speed of the clockwork.

Thermo elements T are connected with a series of contacts $q\ q$, which are normally open, but which are adapted to be closed in succession by the operation of a cam $p$. This cam $p$ is connected to move with a ratchet-wheel $o$. Movement is imparted to the ratchet-wheel $o$ by means of a pawl $n$, which is connected to an armature $r$ of an electromagnet $m$. The electromagnet $m$ is in circuit with battery B and its circuit is controlled by the gear-wheel $k$. This wheel is provided with four teeth $k'$ to make short contacts with a contact-piece $l$, which is connected to a battery-circuit. Upon the circuit of the magnet $m$ being closed by teeth $k'$ armature $r$ is attracted and movement is imparted to the ratchet-wheel $o$ and the cam $p$, which thus passes progressively from one contact $q$ to the next. The mechanism is so constructed that when the last tooth $g'$ has passed the contact $h$, causing the last short dash to be registered on the tape, the circuit for one of the thermo elements T is interrupted and another of these elements is connected in circuit. In order that there may be no vibrations of the index during the change from one thermo-element circuit to the next, provision is made for cutting out the instrument V. This is accomplished by means of a contact-tooth $i'$, adapted to make contact with a contact-piece $i^2$, thus short-circuiting instrument V. For each impulse through the coil $m$ caused by the contact of each tooth $k'$ the ratchet-wheel $o$ is moved forward one tooth. After passing four teeth the instrument V is connected with the next circuit.

In order to prevent the effect of any slight backward movement of the contact-wheel $k$, which is likely to occur in all clockwork-actuated mechanisms, from affecting the movement of wheel $o$, a retarding device $s$ is provided for armature $r$.

Having thus described my invention, the following is what I claim as new therein and desire to secure by Letters Patent:

1. An apparatus for automatically and continuously measuring and recording the value of a plurality of electrical quantities, said apparatus comprising a single measuring instrument, means to connect the same at regular time intervals with the circuits of the electrical quantities to be measured, and means for recording the measurements in time instants which bear a fixed relation to those in which the instrument is connected.

2. An apparatus for the continuous and automatic measuring and recording of the value of a plurality of electrical quantities, said apparatus comprising a single measuring instrument, means for connecting the same at regular intervals of time with the circuits of the electrical quantities to be measured, means for recording said measurements at instants of time bearing a fixed relation to the intervals in which the instrument is connected, and a clockwork mechanism controlling the connecting and recording means.

3. An apparatus for automatically and continuously measuring and recording a plurality of electrical quantities, said apparatus comprising a single measuring instrument, means for switching the same at regular intervals of time in the circuits in which the electrical quantities are to be measured, a recording device, and means for operating the same at instants of time bearing a fixed relation to the intervals in which the instrument is connected to said circuits, a clockwork mechanism controlling the switching and recording means, and means for automatically short-circuiting the measuring and recording mechanism when the instrument is switched from one circuit to another.

4. An apparatus for automatically and continuously measuring a plurality of electrical quantities, said apparatus comprising a single measuring instrument, a recording device, a switch device for connecting the apparatus at regular intervals of time with the circuits of the electrical quantities to be measured, a clockwork mechanism, and means operated thereby to actuate the recording mechanism at regular instants of time, said means controlling the recording mechanism, also controlling said switch mechanism whereby the instants of time at which the recording device is operated bears a fixed relation with the intervals of time in which the several circuits of the quantities to be measured are connected with the instrument.

5. An apparatus for automatically and continuously measuring and recording a plurality of electrical quantities, said apparatus comprising a single measuring instrument, automatically-operated means for switching the same at regular intervals of time in the circuits of the electrical quantities to be measured, means for recording at instants of time bearing a fixed relation with said intervals the value of said quantities, a common clockwork mechanism controlling said connecting and recording means, means for short-circuiting the recording instrument when leaving one circuit and passing to the next without being disconnected from one circuit and connecting with the next, and a retarding device for preventing the operation of the switching device by momentary reversals of the clockwork mechanism.

PAUL RASEHORN.

Witnesses:
 WOLDEMAR HAUPT,
 HENRY HASPER.